US008055680B2

(12) United States Patent
Weeden (10) Patent No.: US 8,055,680 B2
(45) Date of Patent: Nov. 8, 2011

(54) ASSIGNING ACCESS CONTROL LISTS TO A HIERARCHICAL NAMESPACE TO OPTIMIZE ACL INHERITANCE

(75) Inventor: Shane Bradley Weeden, Paradise Point (AU)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 11/109,035

(22) Filed: Apr. 19, 2005

(65) Prior Publication Data

US 2006/0236381 A1 Oct. 19, 2006

(51) Int. Cl.
*G06F 7/00* (2006.01)
*G06F 17/30* (2006.01)

(52) U.S. Cl. ........ 707/785; 707/781; 707/783; 707/784; 707/786

(58) Field of Classification Search ........................ None
See application file for complete search history.

(56) References Cited

U.S. PATENT DOCUMENTS

| 5,649,099 | A | * | 7/1997 | Theimer et al. | 726/4 |
| 5,701,458 | A | * | 12/1997 | Bsaibes et al. | 707/9 |
| 5,761,669 | A | * | 6/1998 | Montague et al. | 707/103 R |
| 5,778,222 | A | * | 7/1998 | Herrick et al. | 707/9 |
| 6,202,066 | B1 | * | 3/2001 | Barkley et al. | 707/9 |
| 6,438,549 | B1 | * | 8/2002 | Aldred et al. | 707/9 |
| 6,651,096 | B1 | * | 11/2003 | Gai et al. | 709/223 |
| 2002/0133491 | A1 | * | 9/2002 | Sim et al. | 707/10 |
| 2003/0117434 | A1 | * | 6/2003 | Hugh | 345/744 |
| 2003/0135513 | A1 | * | 7/2003 | Quinn et al. | 707/102 |

\* cited by examiner

*Primary Examiner* — Tim T. Vo
*Assistant Examiner* — Garrett Smith
(74) *Attorney, Agent, or Firm* — Jeffrey S. LaBaw (57) ABSTRACT

Methods, apparatuses, and computer program products are provided for assigning Access Control Lists ('ACLs') to a hierarchical namespace to optimize ACL inheritance. Embodiments include creating an entitlement matrix for a plurality of resources; creating a tree structure having a plurality of nodes for the hierarchical namespace in dependence upon the entitlement matrix; creating a plurality of ACLs in dependence upon the entitlement matrix; identifying a plurality of attachment points in the hierarchical namespace for the ACLs in dependence upon ACL attachment rules; and attaching the ACLs to the attachment points. Creating an entitlement matrix for a plurality of resources may be carried out by creating a matrix of resources and permissions for users.

12 Claims, 10 Drawing Sheets

Entitlement Matrix ~ 304

Resource ~ 402

/Company/HR/Payroll ~ 406
/Company/HR/StaffDirectory ~ 410
/Company/Marketing ~ 414
/Company/Sales/Forecasts ~ 418
/Company/Sales/Results ~ 422

Permissions Groups ~ 404

Executives-HR ~ 408
Executives-HR-Marketing-Sales ~ 412
Executives-HR-Marketing-Sales ~ 416
Executives-Sales ~ 420
Executives-HR-Marketing-Sales ~ 424

ASSIGNING ACCESS CONTROL LISTS TO A HIERARCHICAL NAMESPACE TO OPTIMIZE ACL INHERITANCE

BACKGROUND OF THE INVENTION

1. Field of the Invention

The field of the invention is data processing, or, more specifically, methods, apparatuses, and products for assigning ACLs to a hierarchical namespace to optimize ACL inheritance.

2. Description of Related Art

IBM Tivoli® Access Manager includes a body of applications for implementing security policies on applications, such as web portals, operating systems and other applications. Security policies are applied by Access Manager by attaching access control lists (ACLs), protected object policies (POPs), and authorization rules to the objects within the object space that represent the physical resources to be protected. An ACL is a data structure informing software implementing security policy such as Access Manager of the permissions, or access rights, that a user or group has to a specific object, such as a directory or file. Each ACL has one or more ACL entries that describe users and groups whose access to the object is explicitly controlled by the ACL, the specific operations permitted to each user or group and the specific operations permitted to other special and unauthenticated users.

Access Manager uses a hierarchical namespace implemented as a virtual object representation of resources called the protected object space and implements ACL inheritance. ACL inheritance provides a vehicle to reduce the number of ACLs attached to objects in the hierarchical namespace. Objects in the hierarchical namespace that are not assigned an ACL inherit the ACL assigned to the node above the object in a tree structure representation of the hierarchical namespace. Currently techniques exist for defining the tree structure of the hierarchical namespace and the attached ACLs, but such techniques do not provide a mechanism for attaching the ACLs to the tree that optimizes ACL inheritance. There is an ongoing need for a method, apparatus, and computer program product for assigning ACLs to a hierarchical namespace to optimize ACL inheritance.

SUMMARY OF THE INVENTION

Methods, apparatuses, and computer program products are provided for assigning ACLs to a hierarchical namespace to optimize ACL inheritance. Embodiments include creating an entitlement matrix for a plurality of resources, creating a tree structure having a plurality of nodes for the hierarchical namespace in dependence upon the entitlement matrix, creating a plurality of ACLs in dependence upon the entitlement matrix, identifying a plurality of attachment points in the hierarchical namespace for the ACLs in dependence upon ACL attachment rules, and attaching the ACLs to the attachment points. Creating an entitlement matrix for a plurality of resources may be carried out by creating a matrix of resources and permissions for users.

Identifying a plurality of attachment points in the hierarchical namespace for the ACLs in dependence upon ACL attachment rules may be carried out by selecting a node in hierarchical namespace, and determining whether the node is protected; if the node is protected, selecting one of the plurality of ACLs for the node; determining whether the selected ACL is the same as an inherited ACL; and identifying the node as an attachment point for the selected ACL if the selected ACL is not the same as an inherited ACL.

Identifying a plurality of attachment points in the hierarchical namespace for the ACLs in dependence upon ACL attachment rules may also be carried out by selecting a node in hierarchical namespace, and determining whether the node is protected; if the node is not protected, determining whether the node has children; if the node has children, selecting an ACL for inheritance to the children in dependence upon child inheritance selection rules; determining whether the selected ACL is the same as an inherited ACL; and identifying the node as an attachment point for the selected ACL if the selected ACL is not the same as an inherited ACL.

Selecting an ACL for inheritance to the children in dependence upon child inheritance selection rules may be carried out by identifying an ACL for each child, and determining the most popular ACL. Determining the most popular ACL may be carried out by incrementing an ACL count for each ACL for each child for whom each ACL is identified, and also incrementing the ACL count for the inherited ACL, if any.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for assigning ACLs to a hierarchical namespace to optimize ACL inheritance. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Assigning ACL to a Hierarchical Namespace to Optimize ACL Inheritance

Figure 1:
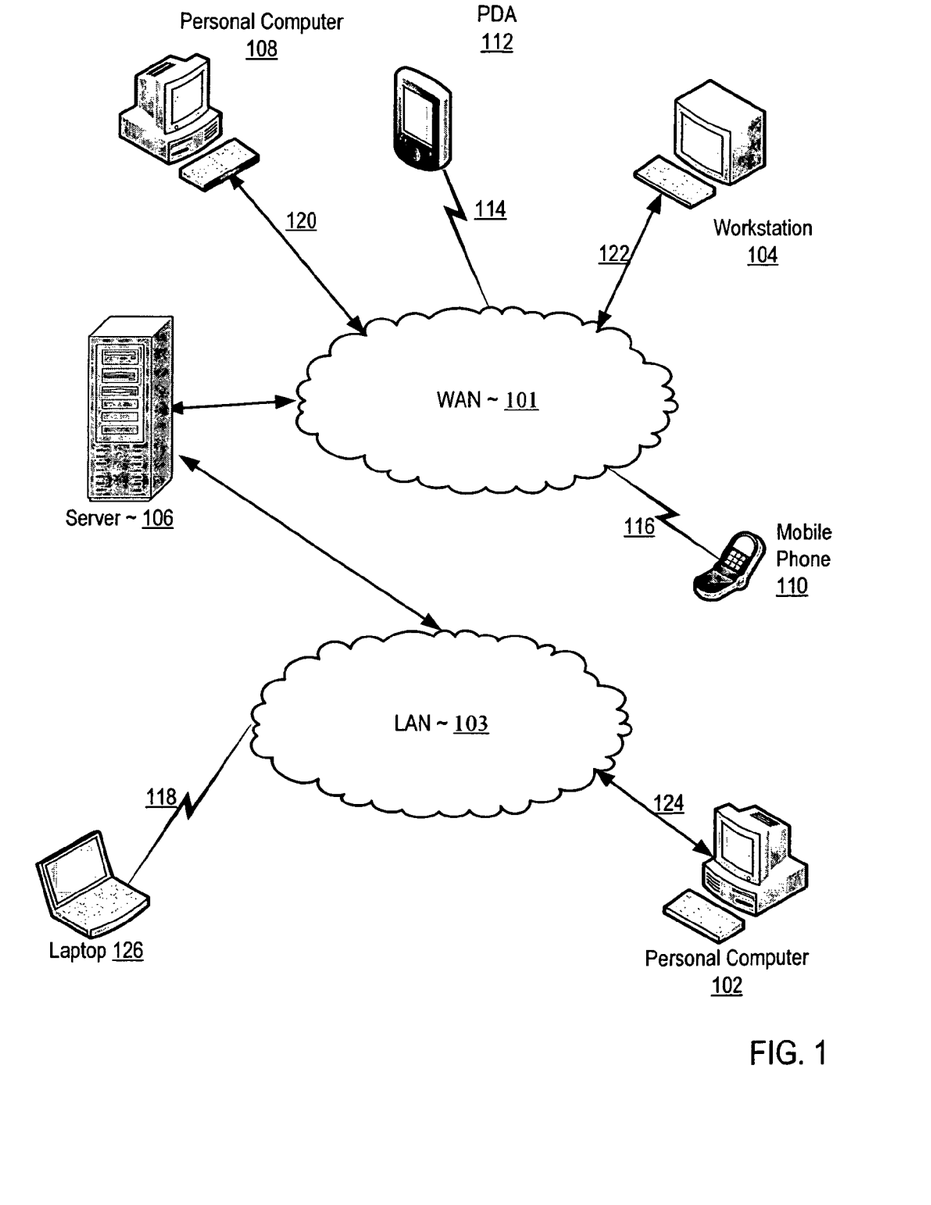
FIG. 1 sets forth a network diagram illustrating an exemplary system of computers each of which is capable of assigning ACLs to a hierarchical namespace to optimize ACL inheritance according to embodiments of the present invention.

Exemplary methods, systems, and products for assigning ACLs to a hierarchical namespace to optimize ACL inheritance according to embodiments of the present invention are described with reference to the accompanying drawings, beginning with FIG. 1. FIG. 1 sets forth a network diagram illustrating an exemplary system of computers each of which is capable of assigning ACLs to a hierarchical namespace to optimize ACL inheritance according to embodiments of the present invention. ACL inheritance provides a vehicle to reduce the number of ACLs attached to objects in a hierarchical namespace. Objects in the hierarchical namespace that are not assigned an ACL inherit the ACL assigned to the node above the object in a tree structure representation of the hierarchical namespace.

The system of FIG. 1 includes a number of computers connected for data communications in networks. Each of the computers of the system of FIG. 1 may have an ACL assignment engine according to embodiments of the present invention capable generally of assigning ACLs to a hierarchical namespace to optimize ACL inheritance by creating an entitlement matrix for a plurality of resources, creating a tree structure having a plurality of nodes for the hierarchical namespace in dependence upon the entitlement matrix, creating a plurality of ACLs in dependence upon the entitlement matrix, identifying a plurality of attachment points in the hierarchical namespace for the ACLs in dependence upon ACL attachment rules, and attaching the ACLs to the attachment points.

ACL attachment rules are rules that use ACL inheritance principles to govern identifying the appropriate nodes in the hierarchical namespace for attaching the appropriate ACLs. ACL attachment rules advantageously provides a vehicle for minimizing the number of ACLs required to define permissions for the resources in a hierarchical namespace.

The data processing system of FIG. 1 includes a wide area network ("WAN") (101) and a local area network ("LAN") (103). The network connection aspect of the architecture of FIG. 1 is only for explanation, not for limitation. In fact, systems for assigning ACLs to a hierarchical namespace to optimize ACL inheritance according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, a server (106) implements a gateway, router, or bridge between the LAN (103) and the WAN (101). Server (106) may be any computer capable of accepting a request for a resource and responding by providing the resource to the requester. One example of such a server is an HTTP ('HyperText Transport Protocol') server or 'web server.'

In the example of FIG. 1, several exemplary devices including a PDA (112), a computer workstation (104), a mobile phone (110), and personal computer (108) are connected to the WAN (101). The network-enabled mobile phone (110) connects to the WAN (101) through a wireless link (116), and the PDA (112) connects to the WAN (101) through a wireless link (114). In the example of FIG. 1, a personal computer (108) connects through a wireline connection (120) to the WAN (101) and a computer workstation (104) connects through a wireline connection (122) to the WAN (101). A laptop (126) connects through a wireless link (118) to the LAN (103) and a personal computer (102) connects through a wireline connection (124) to the LAN (103). In the system of FIG. 1, exemplary devices (108, 112, 104, 110, 126, and 102) support an ACL assignment engine that assigns ACLs to a hierarchical namespace to optimize ACL inheritance.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Assigning ACLs to a hierarchical namespace to optimize ACL inheritance in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in assigning ACLs to a hierarchical namespace to optimize ACL inheritance according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Figure 2:
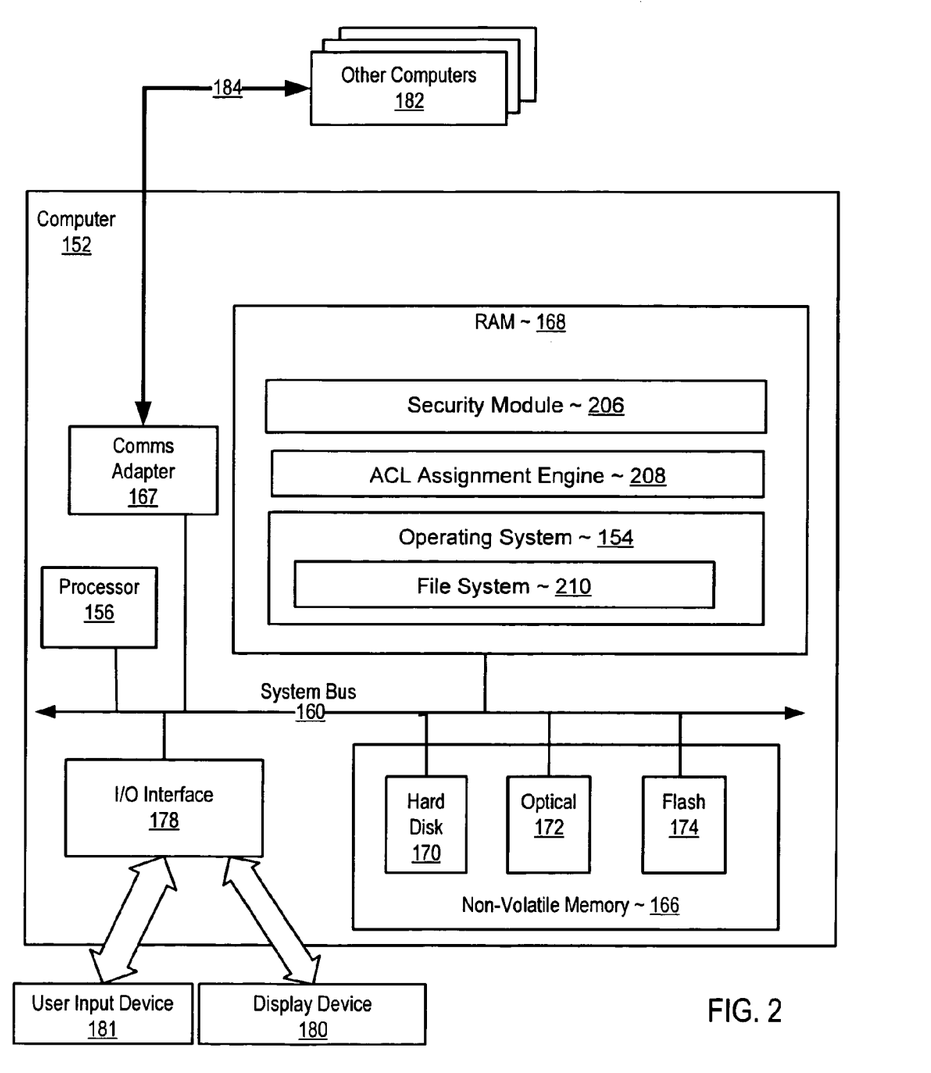
FIG. 2 sets forth a block diagram of automated computing machinery comprising an exemplary computer useful in assigning ACLs to a hierarchical namespace to optimize ACL inheritance according to embodiments of the present invention.

Stored in RAM (168) is a security module (206) that implements security policies for resources define by ACLs assigned to those resources. One example of a currently available application useful as a security module is IBM Tivoli®

Access Manager. Also stored RAM (168) is an ACL assignment engine (208) that comprises computer program instructions for assigning ACLs to a hierarchical namespace to optimize ACL inheritance. ACL assignment engine (208) includes computer program instructions for creating an entitlement matrix for a plurality of resources, creating a tree structure having a plurality of nodes for the hierarchical namespace in dependence upon the entitlement matrix, creating a plurality of ACLs in dependence upon the entitlement matrix, identifying a plurality of attachment points in the hierarchical namespace for the ACLs in dependence upon ACL attachment. rules, and attaching the ACLs to the attachment points.

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. The exemplary operating system (154) also includes a file system (210) having files whose access is controlled by ACLs and implementing ACL inheritance. The ACL assignment engine (208) is also capable of for assigning ACLs to a hierarchical namespace of the file system (210) to optimize ACL inheritance. The operating system (154), security module (206), and ACL assignment engine (208) in the example of FIG. 2 are shown in RAM (168), but many components of such software typically are stored in non-volatile memory (166) also.

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for assigning ACLs to a hierarchical namespace to optimize ACL inheritance according to embodiments of the present invention include modems for wired dial-up communications, Ethernet (IEEE 802.3) adapters for wired network communications, and 802.11b adapters for wireless network communications.

Figure 3:
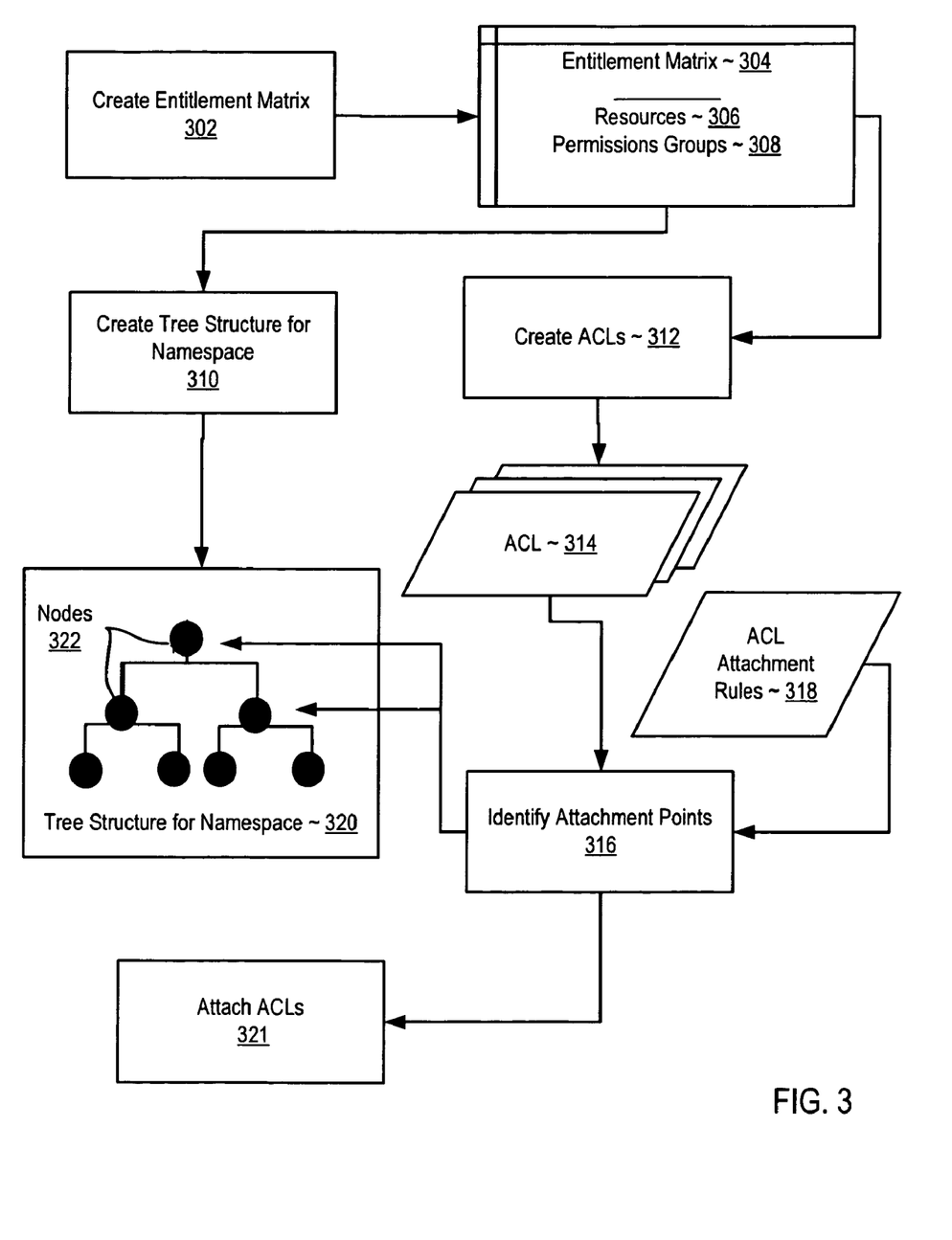
FIG. 3 sets forth a flow chart illustrating an exemplary method for assigning ACLs to a hierarchical namespace to optimize ACL inheritance.

For further explanation, FIG. 3 sets forth a flow chart illustrating an exemplary method for assigning ACLs to a hierarchical namespace to optimize ACL inheritance. An ACL is a data structure informing software implementing security policy such as a security module or operating system of the permissions, or access rights, that a user or group has to a specific system object, such as a directory or file. Each ACL has one or more ACL entries that describe users and groups whose access to the object is explicitly controlled by the ACL, the specific operations permitted to each user or group and the specific operations permitted to other special and unauthenticated users. As described above, ACL inheritance provides a vehicle to reduce the number of ACLs attached to objects in a hierarchical namespace. Objects in the hierarchical namespace that are not assigned an ACL inherit the ACL assigned to the node above the object in a tree structure representation of the hierarchical namespace.

The method of FIG. 3 includes creating (302) an entitlement matrix (304) for a plurality of resources (306). An entitlement matrix is a data structure relating resources in the hierarchical namespace and permissions assigned to users. The exemplary entitlement matrix of FIG. 3 includes two columns, resources (306) and permissions groups (308). The resources column (306) of the entitlement matrix of FIG. 3 includes the objects of the hierarchical namespace. The permissions groups column (308) of the entitlement matrix includes a set of permissions for users of the resource.

Figure 4:
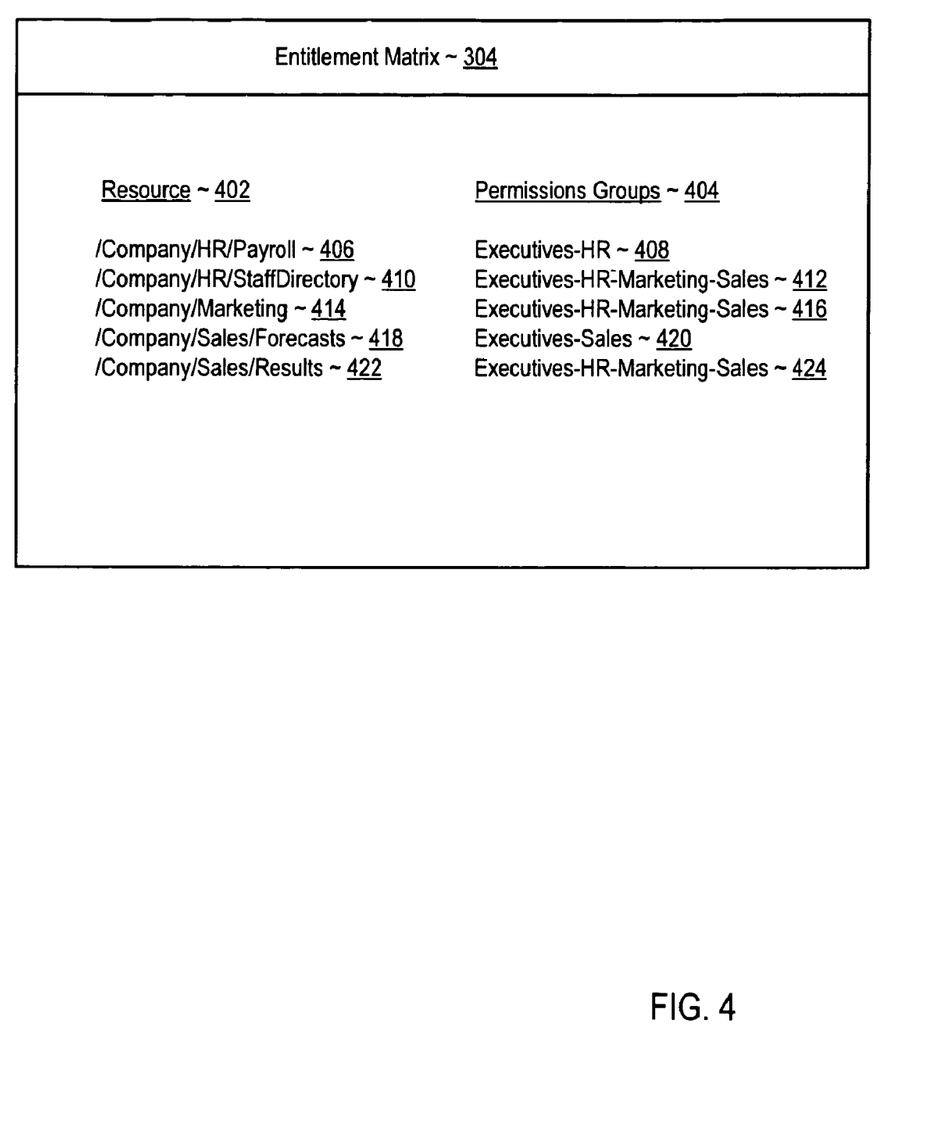
FIG. 4 sets forth a line drawing of an exemplary entitlement matrix.

For further explanation, FIG. 4 sets forth a line drawing of an exemplary entitlement matrix (304). The entitlement matrix of FIG. 4 includes a column (402) for resources of the hierarchical namespace and a column (404) for permissions groups having permissions for the resources. The exemplary entitlement matrix (304) includes five resources in the namespace. The resources (402) include a payroll application (406) located in the namespace at /Company/HR/Payroll whose permissions indicate that the payroll application (406) may be accessed by the executives and human resources ('HR') user groups (408). The resources (402) include a staff directory (410) located in the namespace at /Company/HR/StaffDirectory whose permissions indicate that the staff directory (410) may be accessed by the executives, human resources ('HR'), marketing, and sales user groups (412). The resources (402) also include a marketing application (414) located in the namespace at /Company/Marketing whose permissions indicate that the marketing application (414) may be accessed by the executives, human resources ('HR'), marketing, and sales user groups (416). The resources (402) also include a sales forecast application (418) located in the namespace at /Company/Sales/Forecasts whose permissions indicate that the sales forecast application (418) may be accessed by the executives and sales user groups (420). The resources (402) also include sales results (422) located in the namespace at /Company/Sales/Results whose permissions indicate that the sales results (422) may be accessed by the executives, human resources ('HR'), marketing, and sales user groups (424).

In the example of FIG. 4, the user groups in the permissions groups (404) column of the entitlement matrix (304) have all or nothing access to the resources. This is for ease of explanation and not for limitations. In fact, ACLs often allow for fine granularity in assigning permissions to users as will occur to those of skill in the art. Entitlement matrixes may define limited access for user groups with as fine granularity necessary for providing adequate security to the resource.

Again with reference to FIG. 3: After creating an entitlement matrix (304), the method of FIG. 3 includes creating (310) a tree structure (320) having a plurality of nodes (322) for the hierarchical namespace in dependence upon the entitlement matrix (304). The tree structure (320) advantageously provides a vehicle for identifying nodes and assigning to the nodes the appropriate ACL in accordance with the present invention.

The method of FIG. 3 also includes creating (312) a plurality of ACLs (314) in dependence upon the entitlement matrix (304). Creating (312) a plurality of ACLs (314) in dependence upon the entitlement matrix (304) may be carried out by defining the permissions for users for each resource and then creating an ACL for each unique set of permissions. As will occur to those of skill in the art many resources will have the same sets of users permissions and therefore the method of FIG. 3 includes creating a generalized ACL for those resources.

Returning briefly to FIG. 4: The entitlement matrix of FIG. 4, for example, defines three unique sets of permissions for the five resources, thus establishing three generalized ACLs. The first set includes the executives and human resources ('HR') user groups (408) having access to the payroll application (406) located in the namespace at /Company/HR/Payroll. The second set includes the executives, human resources ('HR'), marketing, and sales user groups (412, 416, and 424) having access to the staff directory (410) located in the namespace at /Company/HR/StaffDirectory, the marketing application (414) located in the namespace at /Company/Marketing, and the sales results (422) located in the namespace at /Company/Sales/Results. The third set includes the executives and sales user groups (420) having permission to the sales forecast (418) located in the namespace at /Company/Sales/Forecasts. Creating a generalized ACL for each of the three sets of permissions advantageously allows the permission defined in the entitlement matrix for five resources to be defined in three ACLs.

Again with reference to FIG. 3: The method of FIG. 3 includes identifying (316) a plurality of attachment points in the hierarchical namespace for the ACLs in dependence upon ACL attachment rules (318) and attaching (321) the ACLs (314) to the attachment points. ACL attachment rules (318) are rules that use ACL inheritance principles to govern identifying the appropriate nodes in the hierarchical namespace for attaching the appropriate ACLs. ACL attachment rules advantageously provides a vehicle for minimizing the number of ACLs required to define permissions for the resources in a hierarchical namespace.

Figure 5:
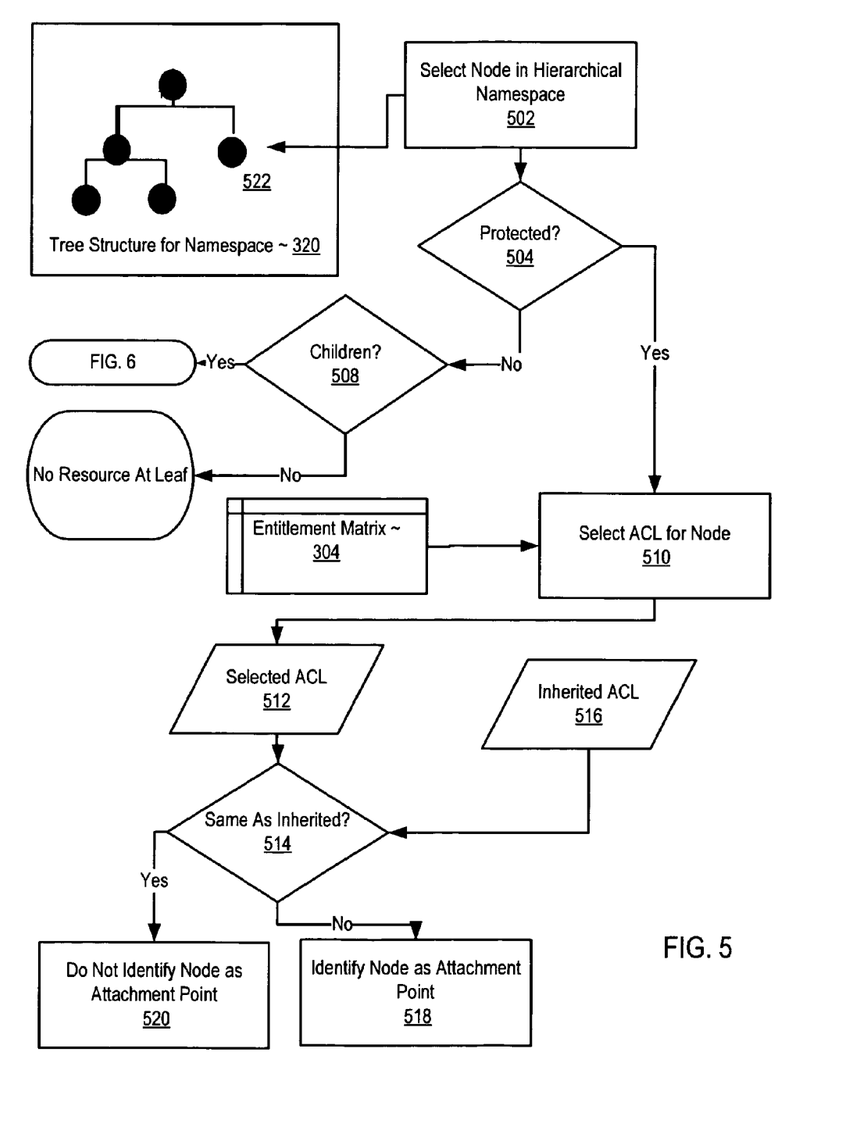
FIG. 5 sets forth a flow chart illustrating an implementation of ACL attachment rules.

For further explanation, FIG. 5 sets forth a flow chart illustrating an implementation of ACL attachment rules. FIG. 5 sets forth a flow chart illustrating an exemplary method for identifying a plurality of attachment points in the hierarchical namespace for the ACLs in dependence upon ACL attachment rules. The method of FIG. 5 may be implemented recursively node-by-node from the top of the tree structure representation to the hierarchical namespace to each resource located at the end of a branch of the tree.

The method of FIG. 5 includes selecting (502) a node (522) in hierarchical namespace (320) and determining (504) whether the node (522) is protected. A protected node is a node in the tree like structure specifically identified as a resource in the entitlements matrix (304). Such protected resources require resource specific ACLs. If the node (522) is not explicitly listed in the entitlements matrix (304), the method of FIG. 5 includes determining (508) whether the node (522) has children. If the node has children, then the node is not a leaf node using the terminology of a tree structure and processing occurs according to the method of FIG. 6 discussed below. If the node does not have children, the node is a leaf with no resource.

If the node (522) is protected, the method of FIG. 5 includes selecting (510) one (512) of the plurality of ACLs (314) for the node (522) in dependence upon the entitlement matrix (304). The selected ACL implements the specific ACL policy defined by the entitlement matrix for the resource at the node (522). Selecting (510) one (512) of the plurality of ACLs (314) for the node (522) may be carried out by retrieving from the entitlement matrix (304) the permission for the resource located at the node and selecting an ACL that represents the required permissions.

The method of FIG. 5 also includes determining (514) whether the selected ACL (512) is the same as an inherited ACL (516). An inherited ACL is the nearest ACL located in the path of parent nodes above the currently identified node and therefore the ACL defining the permission that would be inherited by the node if no ACL were attached to the node. If the selected ACL (512) is the same as an inherited ACL (516) then the method of FIG. 5 does not identify (520) the node as an attachment point and no ACL is attached to the resource at the node.

If the selected ACL (512) is not the same as an inherited ACL (516), then the inherited ACL does not adequately define the permissions for the resource at the node and the method of FIG. 5 includes identifying (518) the node (522) as an attachment point for the selected ACL (512). The selected ACL is then attached to the resource at the node.

Figure 6:
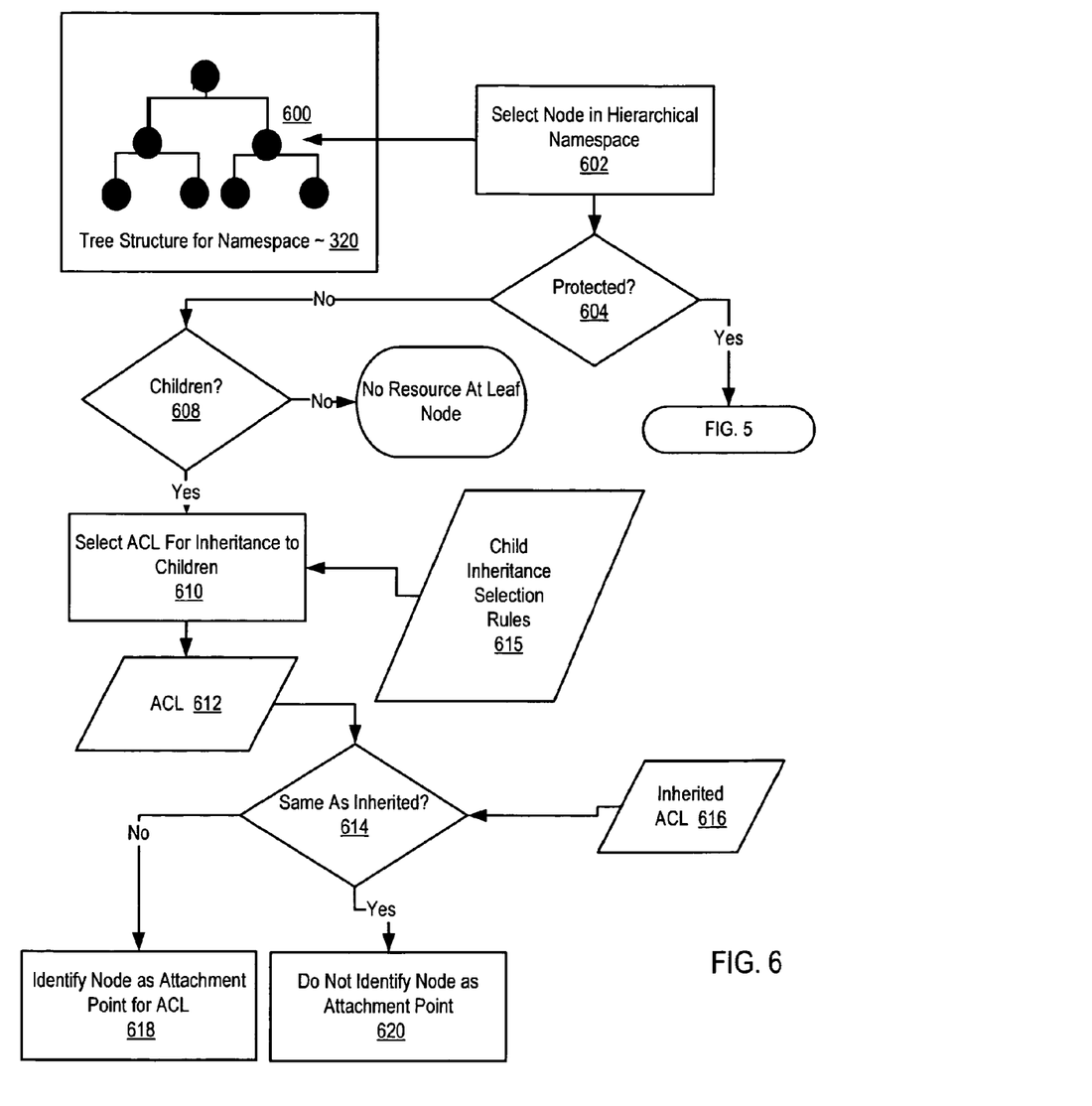
FIG. 6 sets forth a flow chart illustrating an implementation of ACL attachment rules for nodes with children.

The method of FIG. 5 implements exemplary ACL attachment rules for nodes without children. FIG. 6 sets forth a flow chart illustrating an implementation of ACL attachment rules for nodes with children. For further explanation, FIG. 6 sets forth a flow chart illustrating an exemplary method for identifying a plurality of attachment points in the hierarchical namespace for the ACLs in dependence upon ACL attachment rules that includes selecting (602) a node (600) in hierarchical namespace (320) and determining (604) whether the node (600) is protected. In the example of FIG. 6, if the node (600) is explicitly protected in the entitlements matrix (304) processing continues as discussed above with reference to FIG. 5.

If the node is not protected, the method of FIG. 6 includes determining (608) whether the node (600) has children. If the node does not have children, then the node is a leaf node and there is no resource located at the node.

Figure 7:
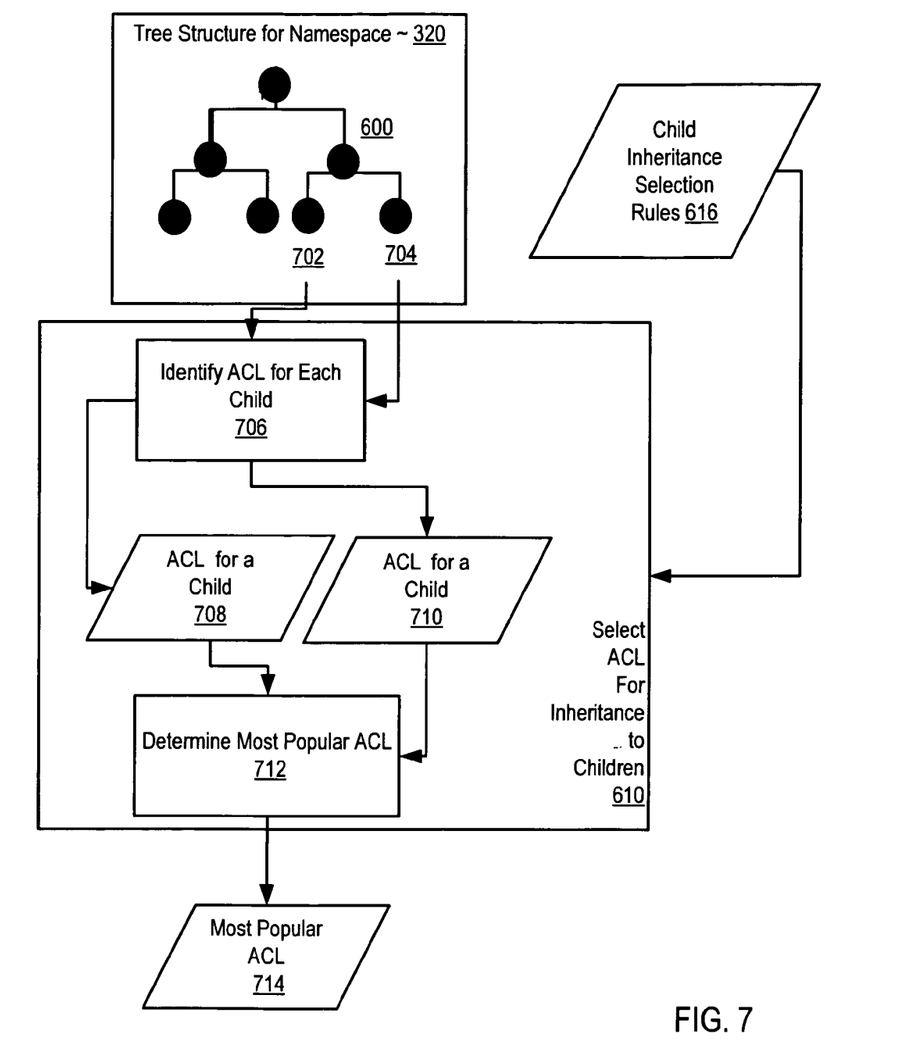
FIG. 7 sets forth a flow chart illustrating an, exemplary method for selecting a ACL for inheritance to the children that optimizes ACL inheritance.

If the node has children, the method of FIG. 6 includes selecting (610) an ACL (612) for inheritance to the children in dependence upon child inheritance selection rules (615). Child inheritance selection rules define rules for selecting an ACL that optimizes ACL inheritance for the children. Exemplary methods for selecting (610) an ACL (612) for inheritance to the children in dependence upon child inheritance selection rules (615) discussed in more detail below with reference to FIGS. 7 and 8.

After selecting (610) an ACL (612) for inheritance to the children, the method of FIG. 6 includes determining (614) whether the selected ACL (612) is the same as an inherited ACL (616). As discussed above, an inherited ACL is the nearest ACL located in the path of parent nodes above the currently identified node, and therefore, the ACL defining permissions that would be inherited by the current node if no ACL were attached to the current node. If the ACL (612) is the same as an inherited ACL (616) then the method of FIG. 6 does not identify (620) the node as an attachment point and no ACL is attached to the resource at the node because the permissions defined by the ACL are already inherited at the node.

If the selected ACL (612) is not the same as an inherited ACL (616), then the inherited ACL does not adequately define the permissions for the children of the node that optimizes ACL inheritance and the method of FIG. 6 includes identifying (618) the node (600) as an attachment point for the selected ACL (612). The selected ACL is then attached to the resource at the node.

The method of FIG. 6 selects (610) an ACL (612) for inheritance to the children in dependence upon child inheritance selection rules (615) that optimizes the use of ACL inheritance to reduce the number of ACLs attached to resources in the hierarchical namespace. For further explanation, FIG. 7 sets forth a flow chart illustrating an exemplary method for selecting (610) an ACL (612) for inheritance to the children in dependence upon child inheritance selection rules (615), The method of FIG. 7 includes identifying (706) an ACL (708 and 710) for each child (702 and 704) and determining (712) the most popular ACL (714). This algorithm is applied recursively for child nodes that do not require an explicit ACL policy and have child nodes of their own. More details on the recursive nature of this determination can be found in the exemplary pseudo-code that follows. In some examples of the method of FIG. 7, the most popular ACL is an ACL that represents more children than any other ACL identified for any of the children. In some cases, however, more than one ACL will represent the same number of children. That is, in some cases there is a tie for the ACL that represents most of the children. A most popular ACL in such cases may still be selected however.

Figure 8:
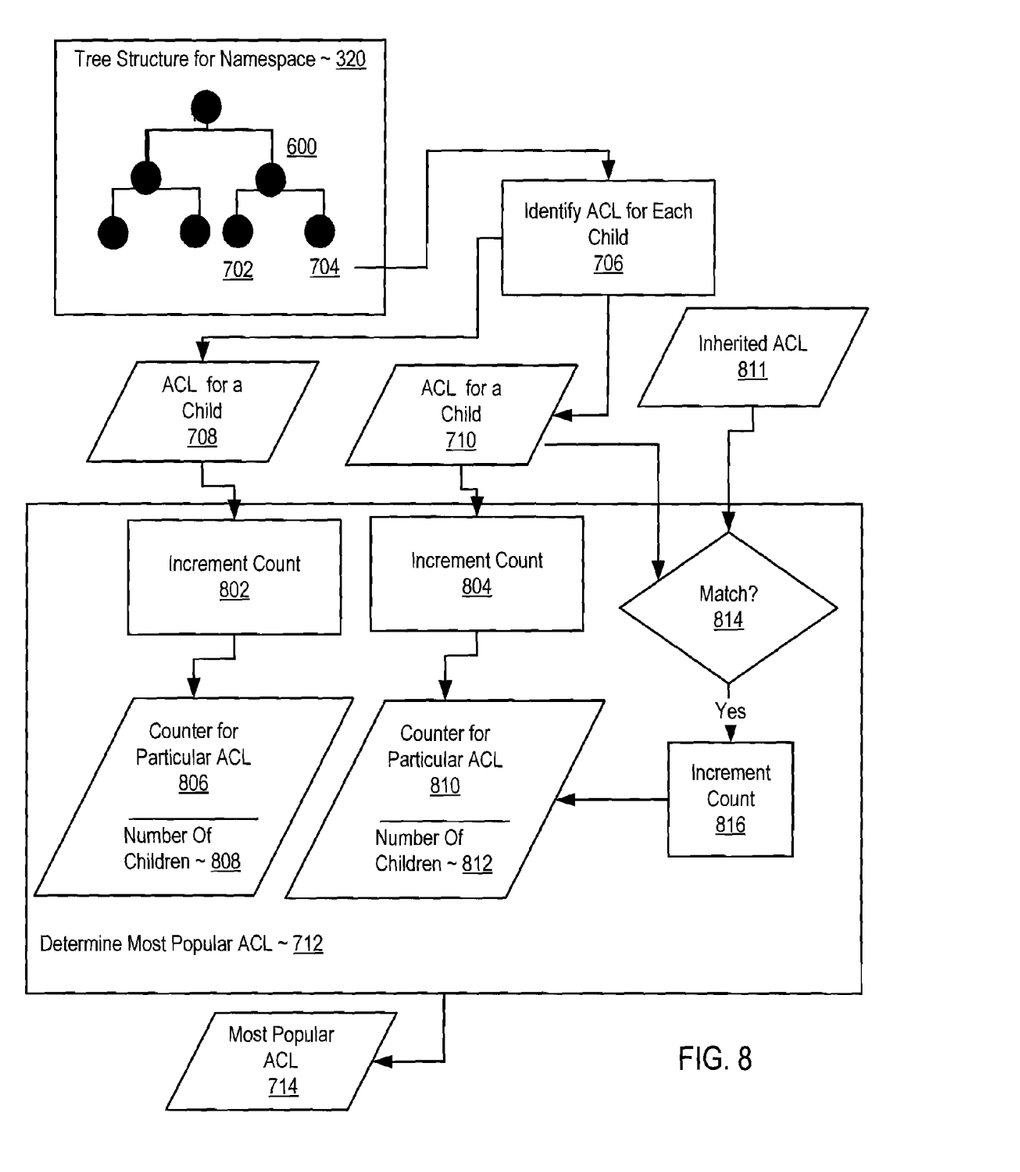
FIG. 8 sets forth a flow chart illustrating an exemplary method for determining the most popular ACL in cases where no single ACL is identified for more than a majority of the children of the node.

For further explanation FIG. 8 sets forth a flow chart illustrating an exemplary method for determining (712) the most popular ACL (714) in cases where no single ACL is identified for more than a majority of the children of the node. In the method of FIG. 8 determining (712) the most popular ACL (714) includes establishing a counter (806 and 810) for each ACL identified among the children and incrementing (802 and 804) an ACL count (808 and 812) for each ACL (708 and 710) for each child (702 and 704) for whom each ACL is identified. In cases where no single ACL represents the majority of the children the counts of at least two counters will be the same.

To identify a most popular ACL, therefore, the method of FIG. 8 determining (814) whether an ACL (710) for a child (704) matches the ACL (810) inherited at the node (600) and incrementing (816) the ACL count (812) for that ACL (710). If an ACL (710) for a child (704) matches the ACL (811) inherited at the node (600), then the ACL (710) is determined to be most popular because assigning the permission of that ACL to the node optimizes ACL inheritance and reduces the number of ACLs attached to resources in the hierarchical namespace that matches the ACL (810) inherited at the node (600). If an ACL (710) for a child (704) matches the ACL (811) inherited at the node (600), then no ACL is in fact attached to the node (600) because the permission inherited at the node already represent the most popular ACL.

For further explanation, consider the following exemplary pseudo code example. In the following example, a pseudo-code example is applied to a hierarchical namespace illustrated in FIG. 9 whose resources have permission defined in the entitlement matrix of FIG. 4. The pseudo-code example below identifies attachment points in the hierarchical namespace of FIG. 9 for the three ACLs identified in the entitlement matrix of FIG. 4 to optimized ACL inheritance. The three ACLs representing permissions for five resources in the entitlement matrix of FIG. 4 include:

| ACL 1 | | |
| --- | --- | --- |
| Group | Executives | Access |
| Group | HR | Access |
| Group | Marketing | No Access |
| Group | Sales | No Access |
| ACL 2 | | |
| Group | Executives | Access |
| Group | HR | No Access |
| Group | Marketing | No Access |
| Group | Sales | Access |
| ACL 3 | | |
| Group | Executives | Access |
| Group | HR | Access |
| Group | Marketing | Access |
| Group | Sales | Access |

Figure 9:
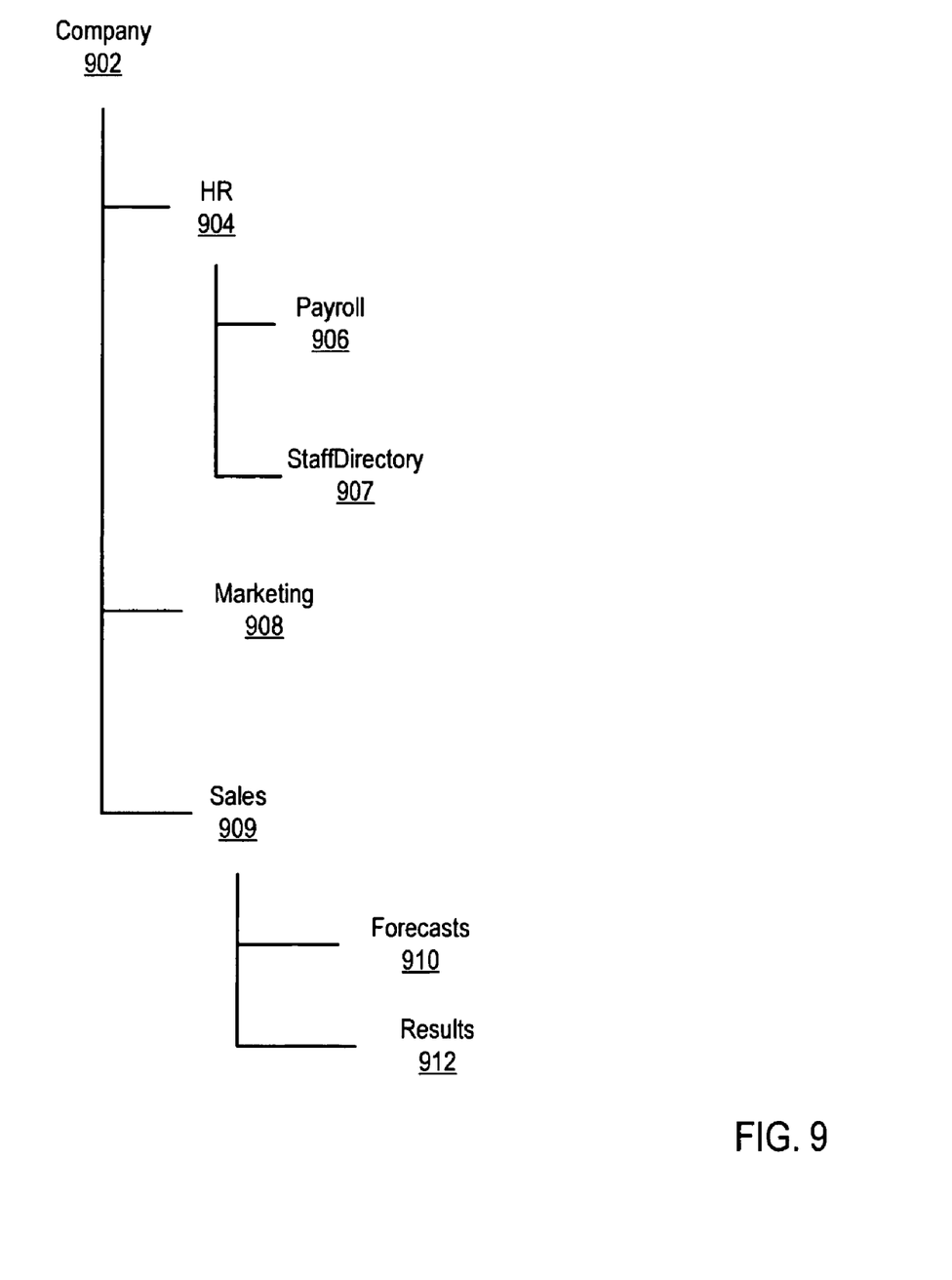
FIG. 9 sets forth an exemplary hierarchical namespace for the resources of the entitlement matrix of FIG. 4.

The following pseudo-code example includes two separate recursive algorithms to identify attachment points in the hierarchical namespace of FIG. 9 for the three ACLs. The first recursive algorithm is called apply_policy( ) which traverses the tree starting at the root and implements the attachment of ACL's to the hierarchical namespace. The second recursive algorithm is called determine_most_popular acl( ) which determines which ACL to attach to each node. apply_policy ( ) does not attach any ACL if the ACL determined for the node is already inherited at the node.

```
void apply policy( node )
    {if ( this is a leaf node )
        {if ( inherited ACL is the same as the required ACL for this node )
            {// Do nothing because inherited policy applies
            }
        else
            {attach required ACL to this node;
            }
        done;
    }
    else
    {
        // not a leaf node - i.e. node has children
        if ( explicit ACL policy required for this node )
            {if ( inherited ACL is the same as the required ACL for this
                node )
            {
                // Do nothing because inherited policy applies
            }
            else
                {attach identified ACL to this node;
                }
            }
            else
                {determine "most popular" ACL for children of this
                    node (details below);
            if ( inherited ACL is the same as the most popular ACL )
            {
            // Do nothing because inherited policy applies
            }
            else
                {"most popular" ACL to this node for inheritance benefit
                of children;
                }
            }
            // now for the recursive part
            foreach (child node)
        {apply_poicy(child_node);
            }
        }
    }
ACLSet dermine most_popular acl( node )
    ///determining "most popular" ACL for children is also recursive and
    operates by initially giving each ACL zero votes, then running a
    popularity algorithm for each child of the current node.
    {
        // acl_votes is a table of numbers (votes) indexed by ACL
        // it is initialized with all votes set to 0
        acl_votes set to zero's;
        // this may break the tie if all children have same number of ACLs
        add 1 vote for current inherited ACL of node;
        foreach (child_node )
            {add_votes(child_node, acl_votes);
```

```
        }
        // Pick the ACL that has most inheritance "value" to the children.
        That is, the ACL with the most votes.
            // In the event of a tie, all ACL's with the same popularity are
            returned, and
            // the caller can decide what to do (e.g. they can pick any one).
            return (acls_with_most_votes);
}
void add_votes( node, acl_votes )
{
    if ( node requires explicit ACL policy )
    {
        add 1 vote for the required ACL at this node;
    }
    else
        {if ( node has children )
        {
            ACLSet = determine_most _popular_acl( node );
            Normally ACLSet will have the "one most popular" ACL
            in it. Just add 1 vote for that ACL to acl_votes. In case of a
            tie add an appropriate fraction of the 1 vote for each ACL
            with the same popularity. For example, if two ACL's are in
            the set, and 0.5 votes for each. If 3 ACLs are in the set, then
            0.33 votes for each, and so on.
        }
    }
}
```

The pseudo-code example above includes two separate recursive algorithms. The first recursive algorithm is called apply_policy( ) and implements a simple tree traversal to facilitate the attachment of ACL's to the hierarchical namespace. The second recursive algorithm is called determine_most_popular_acl( ) and the algorithm determines which ACL to attach. apply_policy( ) does not attach any ACL if the ACL determined for the node is already inherited at the node.

In applying the exemplary pseudo code example to the hierarchical namespace of FIG. 9, apply_policy( ) begins at the root (902) of the tree structure and applies once to each child node. The termination condition is on leaf nodes. The apply_policy algorithm runs once on each node (902, 904, 906, 907, 908, 909, 910, 912) in the tree. determine_most_popular_acl( ) is recursive and may run multiple times over each node depending on how many non-explicitly protected parents a particular node has between themselves and the root.

Applying the pseudo-code example above to the exemplary heirarchial namespae of FIG. 9 which include the resources of FIG. 4, apply_policy( ) is called on the root node /Company (902)./Company (902) is not a leaf node and does not require an explicit ACL policy defined in the entitlement matrix of FIG. 4. The algorithms above therefore are applied to determine the most popular ACL. The result of determining the most popular ACL, which is described in more detail below, is ACL3. Because there is no inherited ACL at the root, the algorithms above attach ACL3 at the /Company node.

To determine the most popular ACL for /Company (902) the algorithm above operates by initializing an ACLVOTES structure for tracking ACL votes for each ACL to zero. The ACLVOTES structure is initialized as follows: ACLVOTES={ACL1:0, ACL2:0; ACL3:0} There is no inherited ACL at the node (902) to add an inheritance vote to any ACL because the algorithm is currently operating on the root /Company.

For each child of /Company, the algorithms above call add_votes(child, ACLVOTES). add_votes is called for each child of /Company (902): /Company/HR (904), /Company/Marketing (908), and /Company/Sales (909).

Beginning with add_votes(/Company/HR, ACLVOTES) the algorithm above determines that Company/HR (904) is not a node which requires an explicit ACL policy because no resource is explicitly listed in the resource matrix of FIG. 4. The node (904), however, has children, and therefore, the algorithms above call determine_most_popular_acl for /Company/HR (904), and add a vote for the one or more ACLs that result from it.

By calling determine_most_popular_acl on /Company/HR (904) a new ACLVOTES structure is created for this recursive run of the branch of Company/HR (904). Note this is not the same ACLVOTES structure being maintained for the count on /Company). Calling determine_most_popular_acl(/Company/HR) will result in two calls to add_votes, one of /Company/HR/Payroll (906), and another for /Company/HR/StaffDirectory (907). Each of these nodes (906 and 907) require explicit ACL policy according to the entitlement matrix of FIG. 4 and therefore one vote will be added for ACL1, and ACL3 respectively. The result of determine_most_popular_acl(/Company/HR) could return EITHER ACL1 or ACL3 since they both have exactly one vote.

Applying this result to the ACLVOTES being maintained for /Company (902) results in adding 0.5 votes for each of ACL1 and ACL3. At the /Company level, the ACLVOTES structure now has the following values {ACL1:0.5, ACL2:0, ACL3:0.5}.

The algorithm above then calls for the node Company/Marketing (908) add_votes(/Company/Marketing, ACLVOTES). This node requires the explicit policy of ACL3 as defined in the entitlement matrix of FIG. 4 and therefore an ACL vote is added for /Company (902). The ACL vote structure at the /Company level now has the following values {ACL1:0.5, ACL2:0, ACL3:1.5}.

Continuing with the exemplary pseudo code, add_votes is called for /Company /Sales (909) by calling add_votes(/Company/Sales, ACLVOTES). This node is similar to /Company/HR (904), and results in 0.5 votes for ACL2 and ACL3. The ACLVOTES structure for /Company (902) now has the following values {ACL1:0.5, ACL2:0.5, ACL3:2.0}.

The current sum of the votes equals the number of children for /Company (902) which is three plus the inherited ACL, which currently does not exist and is therefore 0. The highest votes are currently for ACL3. The fact that the highest votes are currently for ACL3 and /Company (902) has no inherited ACL results in determining that that ACL3 should be attached to /Company (902).

The algorithms above now call apply_policy( ) for /Company/HR (904), with ACL3 attached to /Company (902). Because /Company/HR (904) is not a resource requiring an explicit ACL attachment as defined in the entitlement matrix of FIG. 4, and the node (904) has children, the algorithm determines the most popular ACL for /Company/HR (904).

To determine the popular ACL for /Company/HR (904), an ACLVOTES structure is initialized as follows: ACLVOTES={ACL1:0, ACL2:0; ACL3:1} ACL3 is inherited from /Company (902), and so gets one vote in the structure. This will actually result in breaking the tie between ACL1 and ACL3.

For each child (906 and 907) of /Company/HR (904), the algorithm calls add_votes(child, ACLVOTES) for /Company/HR/Payroll (906) and /Company/HR/StaffDirectory (907). The resulting ACLVOTES structure has the following values. ACLVOTES={ACL1:1, ACL2:0, ACL3:2}. The most popular ACL for /Company/HR (904) is ACL3. Because ACL3 is already inherited at the node (904), the node (904) is not identified as an attachment point and no ACL is attached to /Company/HR (904).

Continuing down the hierarchical namespace, the algorithm above calls apply_policy for each of /Company/HR/Payroll (906) and /Company/HR/StaffDirectory (907). This results in /Company/HR/Payroll (906) requiring the explicit attachment of ACL1 as defined in the entitlement matrix of FIG. 4, and /Company/HR/StaffDirectory (907) requiring the entitlements of ACL3. Because /Company/HR/StaffDirectory (907) inherits ACL3 the node (907) is not identified as an attachment point.

Continuing down the hierarchical namespace, the algorithm calls apply_policy for /Company/Marketing (908), with ACL3 attached to /Company (902). Because /Company/Marketing (908) requires an explicit policy of ACL3 as defined in the entitlement matrix of FIG. 4 and ACL3 is inherited at the node (908), the node (908) is not identified as an attachment point and no ACL is attached.

Continuing down the hierarchical namespace, the algorithm calls apply_policy for /Company/Sales (909) with ACL3 attached to /Company (902). Because /Company/Sales (909) is not a resource requiring an explicit ACL attachment, and it has children, the algorithm determines the most popular ACL for /Company/Sales (909).

To determining most popular ACL for /Company/Sales (909), an ACLVOTES structure is initialized as follows. ACLVOTES={ACL1:0, ACL2:0; ACL3:1} ACL3 is inherited from /Company (902), and so it is initialized with one vote. This initialized value will result in breaking the tie between ACL2 and ACL3.

For each child (910 and 912) of /Company/Sales (909), the algorithm calls add_votes(child, ACLVOTES) for /Company/Sales/Forecasts (910) and /Company/Sales/Results (912). At the completion of these calls, the ACLVOTES structure has the following values ACLVOTES={ACL1:0, ACL2:1, ACL3:2}. Because the most popular ACL for /Company/Sales is ACL3, and ACL3 is inherited at the node (909), the node (909) is not identified as an attachment point.

Continuing down the hierarchical namespace, the algorithm above calls apply_policy for each of /Company/Sales/Forecasts (910) and /Company/Sales/Results (912) which results in determining that /Company/Sales/Forecasts (910) has an explicit attachment of ACL2 defined in the entitlement matrix of FIG. 4, and /Company/Sales/Results (912) has the permissions of ACL3. /Company/Sales/Results (912) inherits ACL3 and therefore no ACL is attached to the node (912).

Figure 10:
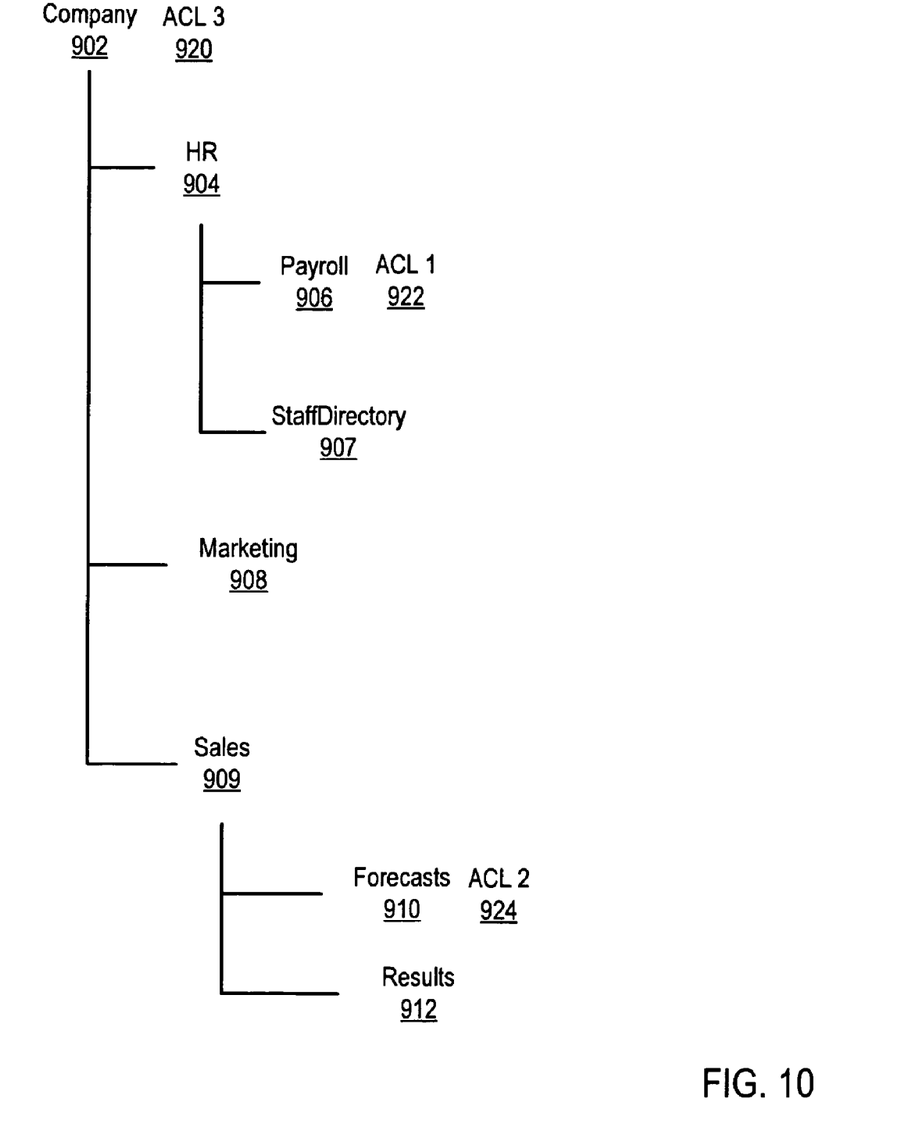
FIG. 10 sets forth an illustration of the results of assigning ACLs to a hierarchical namespace to optimize ACL inheritance according to a pseudo code example.

FIG. 10 sets forth an illustration of the results of assigning ACLs to a hierarchical namespace to optimize ACL inheritance according to the pseudo-code example above. In the example of FIG. 10, ACL3 (920) is identified and attached to company (902) and ACL3 (920) is inherited by HR (904), StaffDirectory (907), Marketing (908) Sales (909), and Results (912). In the example of FIG. 10, ACL1 (922) is identified for Payroll (906) and ACL2 (924) is identified and attached to Forecasts (910). The example of FIG. 10 illustrates that assigning ACLs to a hierarchical namespace according to embodiments of the present invention optimizes ACL inheritance. In the example of FIG. 10, permissions for five resources are advantageously defined by only three ACLs, and only 3 ACL attachment locations. It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for assigning Access Control Lists ('ACLs') to a hierarchical namespace to optimize ACL inheritance, the method comprising:
   creating, by a computer processor, an entitlement matrix for a plurality of resources;
   creating, by the computer processor, a tree structure having a plurality of nodes for the hierarchical namespace in dependence upon the entitlement matrix;
   creating, by the computer processor, a plurality of ACLs in dependence upon the entitlement matrix, wherein each ACL includes permissions that a user or group has to a specific system ebb;
   identifying, by the computer processor, a plurality of attachment points in the hierarchical namespace for the ACLs in dependence upon ACL attachment rules, including determining a most popular ACL, wherein no other ACL represents more nodes in the tree structure than the most popular ACL; and
   attaching, by the computer processor, the ACLs to the attachment points.

2. The computer-implemented method of claim 1 wherein identifying a plurality of attachment points in the hierarchical namespace for the ACLS in dependence upon ACL attachment rules further comprises:
   selecting a node in hierarchical namespace;
   determining whether the node is protected;
   if the node is protected, selecting one of the plurality of ACLS for the node in dependence upon the entitlement matrix;
   determining whether the selected ACL is the same as an inherited ACL; and
   identifying the node as an attachment point for the selected ACL if the selected ACL is not the same as an inherited ACL.

3. The computer-implemented method of claim 1 wherein determining the most popular ACL further comprises:
   incrementing an ACL count for each ACL for each child for whom each ACL is identified;
   determining whether an ACL for a child matches the ACL inherited at the node; and
   incrementing the ACL count for the ACL that matches the ACL inherited at the node if an ACL for a child matches the ACL inherited at the node.

4. The computer-implemented method of claim 1 wherein creating an entitlement matrix for a plurality of resources further comprises creating a matrix of resources and permissions for users.

5. A apparatus for assigning ACLS to a hierarchical namespace to optimize ACL inheritance, the apparatus comprising a computer processor and a computer memory operatively coupled to the computer processor, the computer memory having storing computer program instructions that when executed by the computer processor perform the method comprising:
   creating an entitlement matrix for a plurality of resources;
   creating a tree structure having a plurality of nodes for the hierarchical namespace in dependence upon the entitlement matrix;
   creating a plurality of ACLS in dependence upon the entitlement matrix, wherein each ACL includes permissions that a user or group has to a specific system object;
   identifying a plurality of attachment points in the hierarchical namespace for the ACLS in dependence upon ACL attachment rules, including determining a most popular ACL, wherein no other ACL represents more nodes in the tree structure than the most popular ACL; and attaching the ACLS to the attachment points.

6. The apparatus of claim 5 wherein the computer memory storing further computer program instructions that when executed by the computer processor perform the method comprising:

selecting a node in hierarchical namespace;
determining whether the node is protected;
if the node is protected, selecting one of the plurality of ACLS for the node in dependence upon the entitlement matrix;
determining whether the selected ACL is the same as an inherited ACL; and
identifying the node as an attachment point for the selected ACL if the selected ACL is not the same as an inherited ACL.

7. The apparatus of claim 5 wherein the computer memory storing further computer program instructions that when executed by the computer processor perform the method comprising:

incrementing an ACL count for each ACL for each child for whom each ACL is identified;
determining whether an ACL for a child matches the ACL inherited at the node; and
incrementing the ACL count for the ACL that matches the ACL inherited at the node if an ACL for a child matches the ACL inherited at the node.

8. The apparatus of claim 5 wherein the computer memory storing further computer program instructions that when executed by the computer processor perform the step of creating a matrix of resources and permissions for users.

9. A computer program product for assigning ACLS to a hierarchical namespace to optimize ACL inheritance, the computer program product comprising:

a computer readable storage medium, which stores computer program instructions that when executed perform the method comprising:
creating an entitlement matrix for a plurality of resources;
creating a tree structure having a plurality of nodes for the hierarchical namespace in dependence upon the entitlement matrix;
creating a plurality of ACLS in dependence upon the entitlement matrix, wherein each ACL includes permissions that a user or group has to a specific system object;
identifying a plurality of attachment points in the hierarchical namespace for the ACLS in dependence upon ACL attachment rules, including determining a most popular ACL, wherein no other ACL represents more nodes in the tree structure than the most popular ACL; and
attaching the ACLS to the attachment points.

10. The computer program product of claim 9 wherein identifying a plurality of attachment points in the hierarchical namespace for the ACLS in dependence upon ACL attachment rules further comprise:

selecting a node in hierarchical namespace;
determining whether the node is protected;
determining whether the node has children if the node is protected;
selecting one of the plurality of ACLs for the node in dependence upon the entitlement matrix if the node is protected;
determining whether the selected ACL is the same as an inherited ACL; and
identifying the node as an attachment point for the selected ACL if the selected ACL is not the same as an inherited ACL.

11. The computer program product of claim 9 wherein determining the most popular ACL further comprise:

incrementing an ACL count for each ACL for each child for whom each ACL is identified;
determining whether an ACL for a child matches the ACL inherited at the node; and
incrementing the ACL count for the ACL that matches the ACL inherited at the node if an ACL for a child matches the ACL inherited at the node.

12. The computer program product of claim 9 wherein creating an entitlement matrix for a plurality of resources further comprise creating a matrix of resources and permissions for users.

* * * * *